United States Patent [19]

Inui et al.

[11] Patent Number: 5,167,465
[45] Date of Patent: Dec. 1, 1992

[54] SECURING DEVICE FOR MANIPULATED COMPONENT

[75] Inventors: Syuji Inui; Makoto Kanai; Yoshinori Takahashi, all of Aichi, Japan

[73] Assignee: Toyoda Gosei Co., Ltd., Nishikasugai, Japan

[21] Appl. No.: 698,860

[22] Filed: May 13, 1991

[30] Foreign Application Priority Data

May 14, 1990 [JP] Japan .................................. 2-123742
May 14, 1990 [JP] Japan .................................. 2-123743

[51] Int. Cl.⁵ ............................................ F16D 13/20
[52] U.S. Cl. .................................... 403/317; 403/348; 403/353; 411/553; 200/296; 248/222.3
[58] Field of Search ............... 403/348, 349, 252, 360, 403/350, 316, 317, 343; 411/349, 549, 550, 551, 552, 553; 200/296, 295; 248/27.1, 222.3; 439/552, 556, 353

[56] References Cited

U.S. PATENT DOCUMENTS

| | | | |
|---|---|---|---|
| 3,180,606 | 4/1965 | Sabin et al. | 248/222.3 |
| 4,392,279 | 7/1983 | Schwager | 403/349 X |
| 4,715,569 | 12/1987 | Essig et al. | 200/295 X |

Primary Examiner—Randolph A. Reese
Assistant Examiner—Harry C. Kim
Attorney, Agent, or Firm—Cushman, Darby & Cushman

[57] ABSTRACT

A device for securing a manipulated component to the fitting portion of a panel so that the shaft of the component extends through the panel. The component includes a boss, a flange, and an engagement portion and that the fitting portion is provided with a through hole and a securing apparatus. The boss projects to the fitting portion, and covers the shaft at the rear end thereof. The flange is formed at the front end of the shaft. The engagement portion is provided on a surface at the fitting portion and located in a position different from that of the boss. The flange is inserted through the hole so that the attaching position of the axis of the engagement portion is different from the manipulating position of the axis of the shaft. The securing apparatus secures the component to the fitting portion when the component is moved to such a position as to put the axis of the shaft in the manipulating position after the component is turned about the axis of the engagement portion in the attaching position as the flange remains inserted through the through hole.

4 Claims, 7 Drawing Sheets

SECURING DEVICE FOR MANIPULATED COMPONENT

BACKGROUND OF THE INVENTION

1. Field of the invention

The present invention relates to a device for securing a manipulated component such as a rotary switch, a toggle switch, a push switch, a rotary variable resistor and a rotary variable capacitor to a panel.

2. Description of the Prior Art

Figure 20:
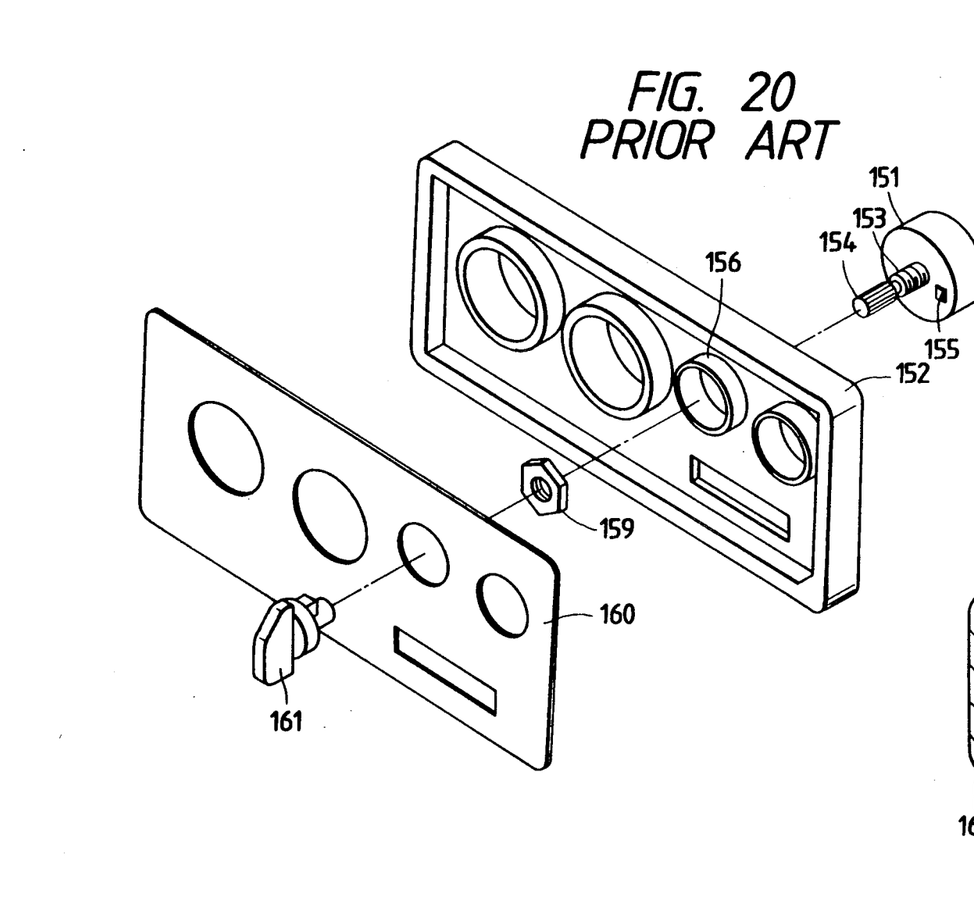
FIG. 20 is a perspective view showing the state that a blower switch of a conventional art is not yet secured to a heater control panel.
Figure 21:
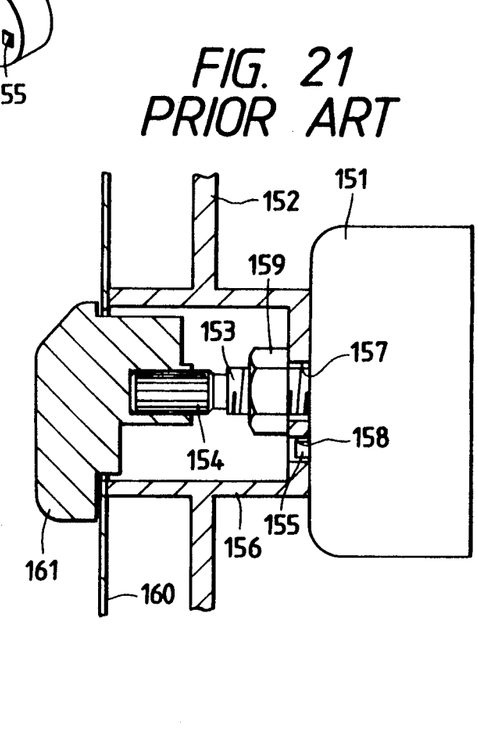
FIG. 21 is a partially sectional view showing the state that the switch is secured to the panel.

A heater control panel for regulating the temperature in the driver room of a motor vehicle is provided in front of the driver seat of the motor vehicle. The panel is fitted with a blower switch, by which the motor of a blower for a heater, an air-conditioner or the like is turned on or off or the rotation speed of the motor is changed incrementally. There are various types of such blower switches, such as a rotary type, a toggle type, a slide type and so forth. For example, a rotary-type blower switch 151 is secured to a heater control panel 152 as shown in FIGS. 20 and 21. The blower switch 151 has a male screw 153 projecting from the front of the switch. The shaft 154 of the switch 151 is rotatably supported by the screw 153. The panel 152 has a cylindrical fitting portion 156. A through hole 157, through which the screw 153 is inserted, and an engagement hole 158, in which the protuberance 155 is engaged, are provided in the rear end part of the fitting portion 156. The shaft 154 is inserted through the through hole 157 so that the protuberance 155 is engaged in the engagement hole 158. A nut 159 is then engaged with the screw 153 and tightened. As a result, the switch 151 is secured to the fitting portion 156 of the panel 152 so that the switch cannot come off the panel and cannot rotate relative thereto. After that, a display sheet 160 is attached to the front of the panel 153, and a manipulation knob 161 is fit to the shaft 154. However, since the nut 159 is tightened on the male screw 153 of the blower switch 151, which is inserted through the through hole 157 of the fitting portion 156 of the panel 152, the number of elements is increased by the nut and the number of working steps is augmented by the tightening of the nut. This is a problem.

SUMMARY OF THE INVENTION

The present invention was made in consideration of the above-mentioned circumstances. Accordingly, it is an object of the invention to provide a device for securing a manipulated component such as a blower switch to a panel such as a heater control panel through simple work without using a nut, to reduce the number of elements and the number of assembly steps.

A device provided in accordance with a first embodiment of the present invention, for securing a manipulated component to the fitting portion of a panel so as to insert the shaft of the component through the panel, includes a component having a boss, a flange and an engagement protuberance, and a fitting portion provided with a through hole and an engagement notch. The boss projects to the fitting portion, and covers the shaft at the rear end thereof. The flange is formed on the boss at the front end thereof. The engagement protuberance projects to the fitting portion from a part different from that from which the boss projects. The flange is inserted through the through hole so that the attaching position of the axis of the shaft in the work of attaching the component to the fitting portion is different from the manipulating position of the axis in the use of the component attached to the panel. The engagement notch is engaged with the engagement protuberance to prevent the turning of the component, when it is slid to put the axis of the shaft in the manipulating position after the component is turned about the shaft with the axis in the attaching position as the flange remains inserted through the through hole.

When the manipulated component is to be secured to the panel, the flange of the component is first inserted through the through hole of the fitting portion of the panel. As a result, the axis of the shaft is put in the attaching position different from the manipulating position thereof. The component is then turned about the shaft with the axis in the attaching position as the flange remains inserted through the through hole. The component is then slid as the flange remains inserted through the through hole, so that the axis of the shaft is put in the manipulating position. As a result, the engagement protuberance is engaged in the engagement notch so as to prevent the component from turning, and the fitting portion of the panel is pinched by the flange and body of the component.

A device in accordance with a second embodiment of the present invention, for securing a manipulated component to the fitting portion of a panel so as to insert the shaft of the component through the panel, includes a component having a boss, a flange, and a protuberance or hole, and a fitting portion having a through hole, a hole or protuberance, and a communication hole. The boss projects to the fitting portion, and covers the shaft at the rear end thereof. The flange is formed on the boss at the front end thereof. The protuberance or hole is formed on or in a part different from that on which the boss is formed. The flange is inserted through the through hole. The hole or protuberance is engaged with the protuberance or hole when the flange is inserted through the through hole. The communication hole communicates with the through hole. The boss is engaged in the communication hole when the manipulated component is turned about the protuberance or hole to put the shaft in a predetermined position as the protuberance or hole remains engaged with the hole or protuberance. When the manipulated component is to be secured to the panel, the flange is inserted through the through hole and the protuberance or hole is engaged with the hole or protuberance. The component is then turned about the protuberance or hole so that the boss of the component is moved from the through hole to the communication hole and is engaged therein. At that time, the shaft of the component is put in the predetermined position, and the fitting portion of the panel is pinched by the flange and body of the component.

BRIEF DESCRIPTION OF THE DRAWING

Other objects, features and characteristics of the present invention as well as the methods of operation and functions of the related elements of the structure, and to the combination of parts, will become apparent upon consideration of the following description and the appended claims with reference to the accompanying drawings, all of which form a part of this specification, wherein like reference numerals designate corresponding parts in the Figures, wherein.

DETAILED DESCRIPTION OF THE PRESENTLY PREFERRED EXEMPLARY EMBODIMENTS

Figure 1:
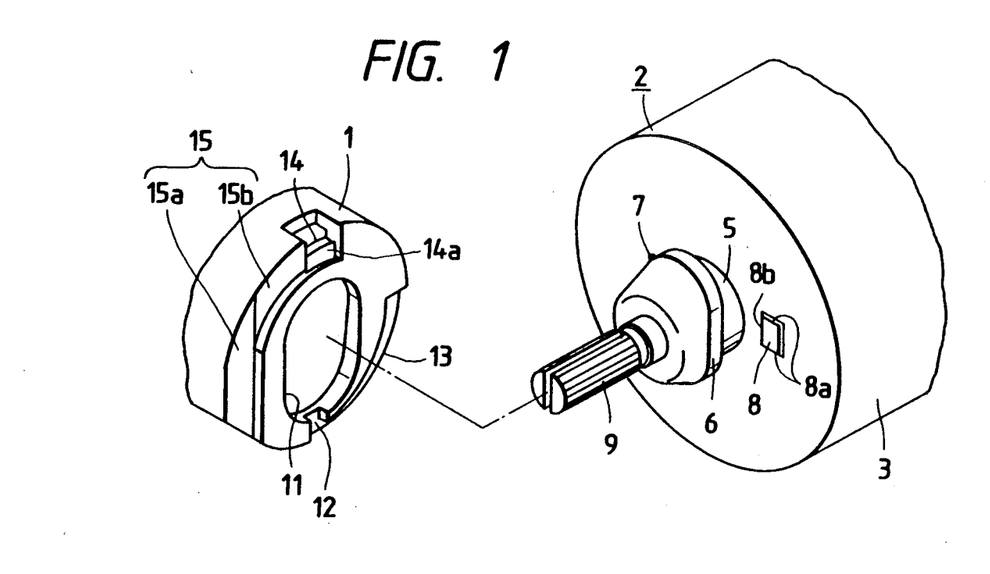
FIG. 1 is a perspective view of a fitting portion and a blower switch of the first embodiment of the present invention.
Figure 3:
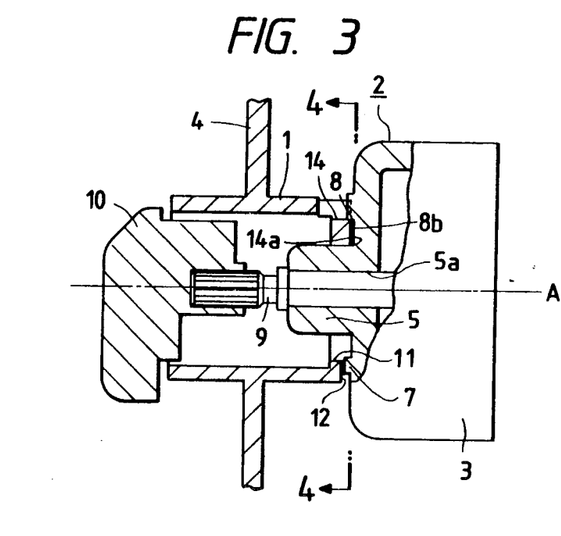
FIG. 3 is a partial sectional view showing the state in which the switch is secured to the fitting portion.
Figure 4:
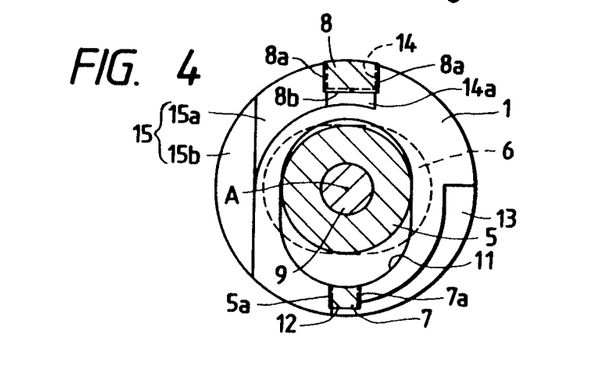
FIG. 4 is a sectional view along line 4—4 shown in FIG. 3.
Figure 5:
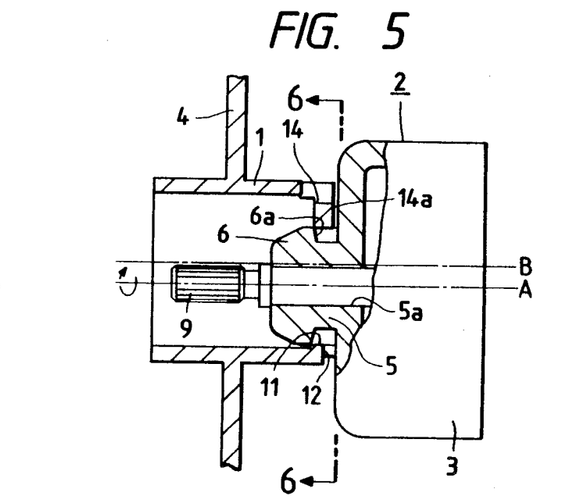
FIG. 5 is a partially sectional view showing the state where the flange of the switch is inserted through the through hole of the fitting portion.

FIGS. 1-8 show a device for securing a rotary-type blower switch 2 to a heater control panel 4 according to the first embodiment of the present invention. FIG. 1 is a perspective view of the fitting portion 1 of the panel 4 and the switch 2 which is a manipulated component to be secured to the fitting portion. The body 3 of the switch 2 is generally shaped as a cylinder. A boss 5 is integrally formed on the front of the body 3, and projects forward therefrom or leftward therefrom with regard to FIG. 1. A flange 6 is integrally formed on the peripheral surface of the front half of the boss 5. The front portion of the flange 6 has a circular cross section of nearly the same diameter as the boss 5. The rear portion of the flange 6 has an elliptic cross section being slender and extending vertically. The flange 6 has a tapered rear surface 6a tapered backward, as shown in FIG. 5.

Figure 2:
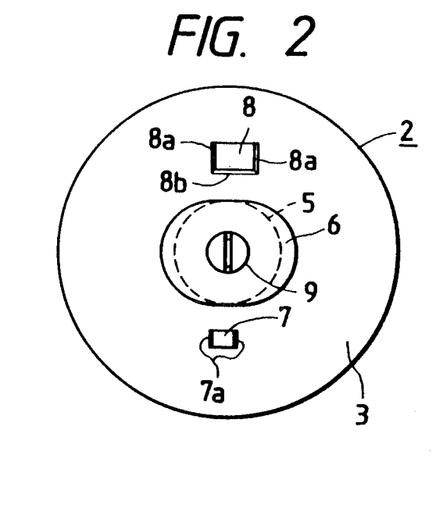
FIG. 2 is a front view of the switch.

FIG. 2 is a front view of the body 3 of the blower switch 2. A first engagement protuberance 7 is provided on the front of the body 3 under the boss 5, and shaped as a quadrangular plate. The right and left sides 7a of the protuberance 7 obliquely extend to gradually approach each other toward the upper surface of the protuberance. A second engagement protuberance 8 larger in size than the first one 7 is provided on the front of the body 3 over the boss 5, and shaped as a quadrangular plate. The right and left sides 8a of the second engagement protuberance 8 obliquely extend to gradually approach each other forward. The lower side 8b of the second engagement protuberance 8 obliquely extends to gradually approach the upper side thereof forward.

As shown in FIG. 3, a shaft 9 for changing the rotation speed of the motor of a blower (which is not shown in the drawings), by switching electric contacts (not shown) therein, is fit in the body 3 of the blower switch 2. The shaft extends through a hole 5a provided through the front portion of the body and the boss 5 in the front-to-rear direction of the switch, so that the shaft is supported. A manipulation knob 10 is fit on the front end portion of the shaft 9, which projects forward from the flange 6. The electric contacts, which are electrically coupled to the blower motor, are provided on the shaft 9 at the rear end thereof so that the contacts are switched for each other as the shaft is turned.

As shown in FIGS. 4 and 5, the fitting portion 1 of the panel 4 is shaped as a bottomed cylinder, and has an elliptic through hole 11 being slender and extending vertically so that the flange 6 can be inserted through the hole. Since the position in which the axis of the shaft 9 is put when the flange 6 is inserted through the through hole 11 is that in which the axis is put in the work of attaching the blower switch 2 to the panel 4, the position is hereinafter referred to as the attaching position A. On the other hand, the position in which the axis of the shaft 9 is put after the work of attaching the switch 2 to the panel 4, namely, the position in which the axis is put in the use of the switch attached to the panel is hereinafter referred to as the manipulating position B. The attaching position A of the axis of the shaft 9 is lower by a small length (which is about 2 mm in this embodiment) than the manipulating position B thereof.

Figure 6:
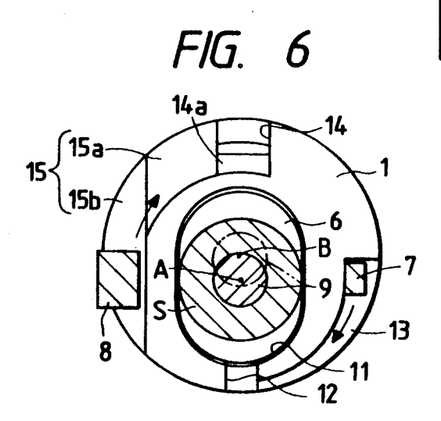
FIG. 6 is a sectional view along line 6–6 shown in FIG. 5.

A first engagement notch 12 is provided in the rear end part of the fitting portion 1 at the bottom thereof. The rear end part has a first guide notch 13 extending up from the first engagement notch 12 along the peripheral surface of the lower half of the right side of the fitting portion 1. The depth of each of the notches 12 and 13 along the axis of the switch 2 is unchanged throughout it. When the flange 6 is inserted through the through hole 11, the first engagement protuberance 7 is located in the upper portion of the first guide notch 13 as shown in FIG. 6. When the blower switch 2 is then turned by an angle of 90 degrees clockwise with regard to FIG. 6, the first engagement protuberance 7 is moved to the first engagement notch 12.

A second engagement notch 14 is provided in the rear end part of the fitting portion 1 at the top thereof. The rear end part has a recess 14a which is located under the second engagement notch 14 and is small in depth from the rear surface of the part. The part also has a second guide notch 15 extending down from the recess 14a along the peripheral surface of the upper half of the left side of the part. The second guide notch 15 extends on an oblique surface 15a with a depth gradually increasing downward from the recess 14a, and extends on a vertical surface 15b with a depth equal to the maximum value of the former depth. When the flange 6 is inserted through the through hole 11, the second engagement protuberance 8 is located on the vertical surface 15b, as shown in FIG. 6. When the blower switch 2 is then turned by an angle of 90 degrees clockwise with regard to FIG. 6, the second engagement protuberance 8 is moved to the recess 14a at the second engagement notch 14.

Figure 7:
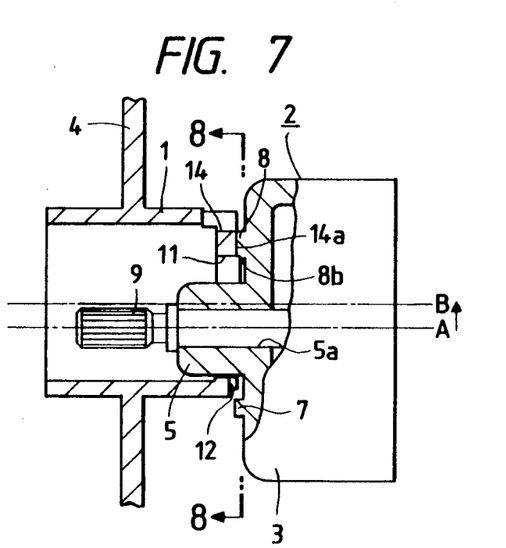
FIG. 7 is a partially sectional view showing the state that the switch is turned by an angle of 90 degrees from a position shown in FIG. 5.
Figure 8:
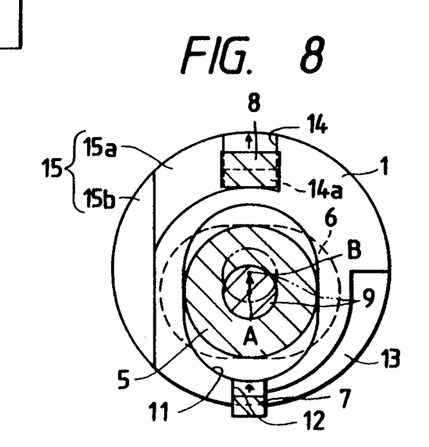
FIG. 8 is a sectional view along line 8–8 shown in FIG. 7.

When the blower switch 2 is to be attached to the fitting portion 1 of the heater control panel 4, the switch is first postured in such a manner that the first and the second engagement protuberances 7 and 8 are located at the right and left sides of the switch, respectively, as shown in FIG. 6. The flange 6 of the switch 2 is then inserted through the through hole 11 of the fitting portion 1 so that the front of the body 3 of the switch is put in contact with the rear of the fitting portion. At that time, the first engagement protuberance 7 is located in the upper portion of the first guide notch 13, the second engagement protuberance 8 is located in the second guide notch 15 on the vertical surface 15b, and the axis of the shaft 9 is put in the attaching position A. When the body 3 is then turned about the shaft 9 by the angle of 90 degrees clockwise with regard to FIG. 6, the first engagement protuberance 7 is moved to the lower portion of the first engagement notch 12 while being guided by the first guide notch 13, and the second engagement protuberance 8 is moved up in the second guide notch 15 while being gradually pushed backward by the oblique surface 15a on the second guide notch and is then moved to the recess 14a under the second engagement notch 14, as shown in FIGS. 7 and 8. At that time, the axis of the shaft 9 is still in the attaching position A under the manipulating position B, and each of the engagement protuberances 7 and 8 is in contact with only one side surface on the corresponding one of the engagement notches 12 and 14 so that the body 3 of the switch 2 cannot be turned further but can be turned in reverse. The body 3 is thereafter slightly pushed up so that the first engagement protuberance 7 is slid up to have its top over the first guide notch 13, the second engagement protuberance 8 is moved up from the recess 14a so as to enter into the second engagement notch 14 while becoming released from the pushing-up force on the body 3, and the axis of the shaft 9 is put into the manipulating position B from the attaching position A, as shown in FIGS. 3 and 4.

At that time, the first engagement protuberance 7 is put in contact with the surfaces on the first engagement notch 12, and the second engagement protuberance 8 is put in contact with the surfaces on the second engagement notch 14, so that the blower switch 2 cannot be turned relative to the attaching portion 1 of the panel 4. Particularly, since the right and left sides 7a and 8a of the engagement protuberances 7 and 8 obliquely extend to approach each other, the sides serve to absorb small gaps between the protuberances and the surfaces on the engagement notches 12 and 14 if any such gap exists between them. Similarly, even if a small gap exists between the second engagement protuberance 8 and the surface on the recess 14a, the obliquely-extending lower side 8b of the protuberance comes into contact with the edge at the top of the recess 14a to absorb the gap. For these reasons, the blower switch 2 does not play between the engagement protuberances 7 and 8 and the surfaces on the engagement notches 12 and 14 in any of the direction of the turning of the switch and the direction of the vertical sliding thereof.

Since the rear end part of the fitting portion 1 of the heater control panel 4 is pinched at the front and rear surfaces of the part by the flange 6 and body 3 of the blower switch 2 as the switch is attached to the fitting portion, the switch is engaged with the portion so as not to come off. Even if a small gap exists between the flange 6 and the fitting portion 1, the tapered rear surface 6a of the flange serves to absorb the gap so as to surely prevent the flange from playing relative to the fitting portion.

After the blower switch 2 is attached to the fitting portion 1 of the panel 4, the manipulation knob 10 is fit onto the shaft 9 from the front of the fitting portion. As a result, the fitting portion 1 restricts the movement of the knob 10 except in the direction of turning thereof. For that reason, the blower switch body 3 coupled to the knob 10 by the shaft 9 is unmovable relative to the fitting portion 1.

Thus, the blower switch 2 is firmly fixed to the fitting portion 1 of the panel 4 through very simple work without using a nut as in conventional prior art. Therefore, the nut and the tightening thereof are not needed, so that the number of elements and that of assembly steps are reduced.

The present invention is not confined to the above-described embodiment, but may be otherwise and optionally embodied or practiced without departing from the spirit or essential character thereof, as described below.

(1) The cross section of each of the flange 6 and the through hole 11 may be shaped as any appropriate form except a circle.

(2) The second guide notch 15 may be obliquely shaped as a whole similarly to the first guide notch 13.

(3) The second engagement protuberance 8, the second engagement notch 14 and the second guide notch 15 may not be provided as far as the blower switch 2 is attached to the fitting portion 1 and engaged to be only unturnable.

(4) The present invention may be applied not only to a rotary switch but also to other various types of manipulated components such as toggle switches, push switches, rotary variable resistors and rotary variable capacitors.

Figure 9:
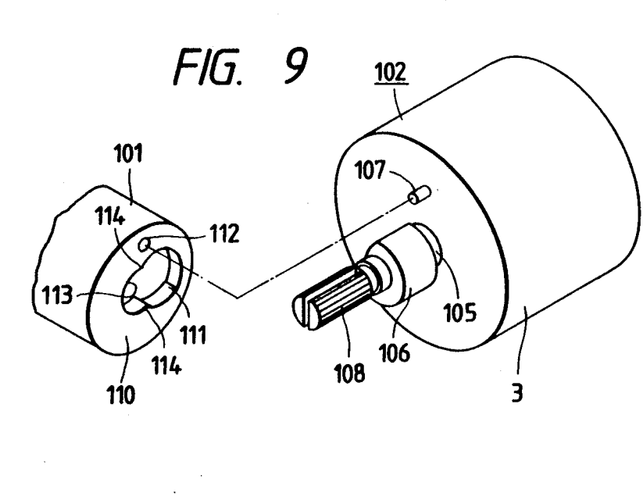
FIG. 9 is a perspective view of a fitting portion and a blower switch of the second embodiment of the present invention.
Figure 10:
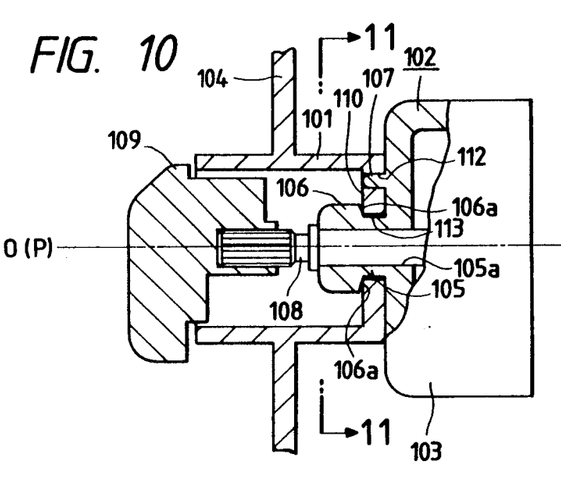
FIG. 10 is a partially sectional view showing the state that the switch is secured to the fitting portion.

FIGS. 9–13 show a device which is for securing a rotary-type blower switch 102 as a manipulated component to a heater control panel 104 according to a second embodiment of the present invention. FIG. 9 is a perspective view of the switch 102 and the fitting portion 101 of the panel 104. FIG. 10 is a partially sectional view showing the state that the switch 102 is secured to the fitting portion 101. The body 103 of the switch 102 is generally shaped as a cylinder. A boss 105 is integrally formed on the central portion of the front (which is the left side with regard to FIGS. 9 and 10) of the body 103 of the switch 102, and projects forward therefrom. A flange 106 is formed on the peripheral surface of the front half of the boss 105.

Figure 11:
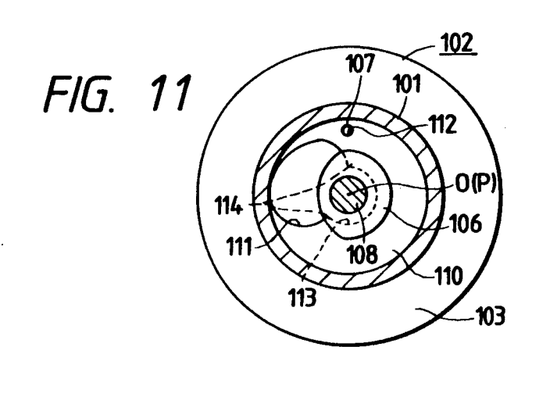
FIG. 11 is a sectional view along line 11—11 shown in FIG. 10.

As shown in FIG. 11, the flange 106 has two arc-shaped peripheral surfaces differing in curvature, and a non-circular surface on the front thereof. As shown in FIG. 10, the flange 106 has a tapered rear surface 106a which is tapered backward. The angle of the tapered rear surface 106a to the axis of the flange 106 is unchanged for the total circumference of the flange. A protuberance 107 shaped as a low column is formed on the front of the body 103 of the switch 102 over the boss 105.

A shaft 108 for changing the rotation speed of the motor of a blower (not shown) by switching electric contacts (not shown) therein is fit in the body 103 of the switch 102, and extends through a hole 105a provided through the front portion of the body and the boss 105 in the front-to-rear direction of the switch, so that the shaft is supported. A manipulation knob 109 is fit on the front end portion of the shaft 108, which projects from the flange 6. The electric contacts, which are electrically coupled to the blower motor, are provided on the shaft 108 at the rear end thereof so that the contacts are switched for each other as the shaft is turned.

As shown in FIGS. 9-13, the fitting portion 101 of the panel 104 is shaped as a bottomed cylinder. The rear end part 110 of the fitting portion 101 has a through hole 111, the position of the axis of which is slightly different from that 0 of the axis of the portion. The hole 111 has nearly the same form as the flange 106 so that the flange can be inserted through the hole. A hole 112 extends through the rear end part of the fitting portion 101 over the through hole 111 so that the protuberance 107 is engaged in the hole 112 when the flange 106 is inserted through the through hole 111. The rear end part 110 has a communication hole 113 which is located at the center of the part and has a diameter nearly equal to the outside diameter of the boss 105 of the blower switch 102. The communication hole 113 communicates with the through hole 111 so that the boss 105 is engaged in the communication hole when the switch 102 is turned about the protuberance 107 in a direction Q (shown in FIG. 13) as the protuberance remains engaged in the hole 112. A pair of holding projections 114 for keeping the boss 105 engaged in the communication hole 113 are provided in the rear end part 110 at the boundary of the through hole 111 and the communication hole.

Figure 12:
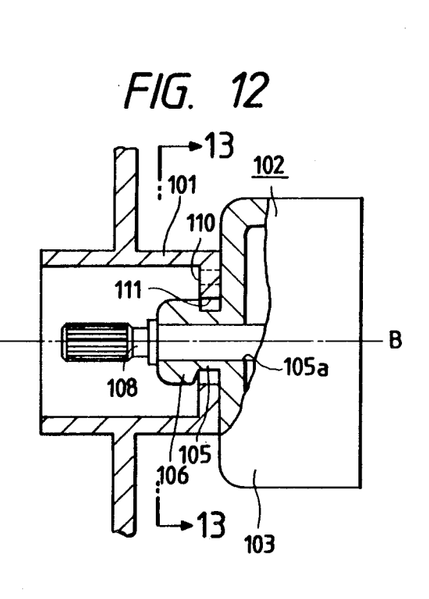
FIG. 12 is a partially sectional view showing the state that the flange of the switch is inserted through the through hole of the fitting portion.
Figure 13:
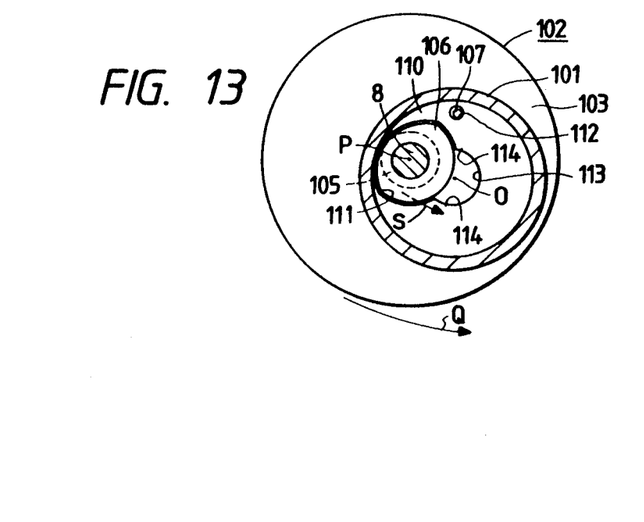
FIG. 13 is a sectional view along line 13—13 shown in FIG. 12.
Figure 14:
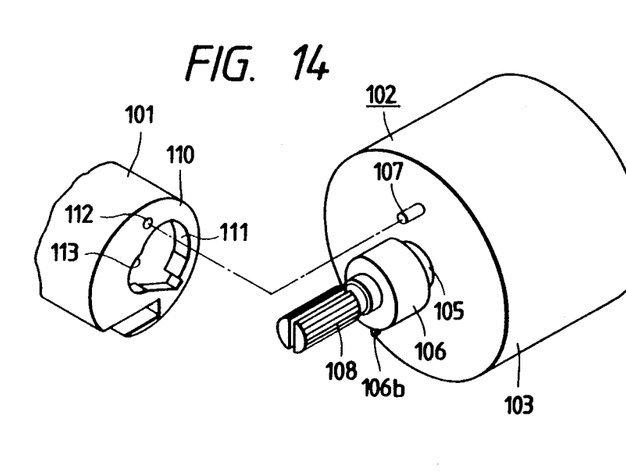
FIG. 14 is a perspective view of a fitting portion and a blower switch of the third embodiment of the present invention.

When the blower switch 102 is to be attached to the fitting portion 101 of the panel 104, the flange 106 of the switch is inserted through the through hole 111 of the fitting portion and the protuberance 107 is engaged in the hole 112 thereof, as shown in FIGS. 12 and 13. At that time, the position 0 of the axis of the fitting portion 101 and that P of the axis of the body 103 of the switch 102 are different from each other. The body 103 is then turned about the protuberance 107 in the direction Q (shown in FIG. 13) as the front of the body is in contact with the rear of the fitting portion. At that time, the peripheral surface of the boss 105 is moved in a movement locus S so that it comes into contact with one of the holding projections 114. For that reason, the turning of the body 103 is stopped by the holding projection 114. A turning force strong enough to cause the boss 105 to move beyond the holding projection 114 is then applied to the body 103 so that the boss moves beyond the projection and is engaged in the communication hole 113, as shown in FIGS. 10 and 11. As a result, the rear end part 110 of the fitting portion 101 is pinched at the front and rear surfaces of the part by the flange 106 and the body 103. The blower switch 102 is thus engaged with the fitting portion 101 so as not to come off. Particularly, the flange 106 has the tapered rear surface 106a so that even if there is a small gap between the flange and the rear end part 110 of the fitting portion 101, the tapered rear surface serves to absorb the gap to surely prevent the switch from playing relative to the fitting portion.

There is a small gap between the boss 105 and the surface on the communication hole 113 as the boss is engaged in the hole. However, since the angle of the tapered rear surface 106a of the flange 106 is unchanged for the total circumference thereof, the tapered rear surface comes into uniform contact with the edge on the communication hole so that when the boss 105 is engaged in the hole, the center of the boss is moved to that of the hole to make the position P of the axis of the body 103 coincident with that 0 of the axis of the fitting portion 101. For that reason, it is not necessary to accurately adjust the position of the blower switch 102 after it is attached to the fitting portion 101 of the panel 104.

Since the pair of holding projections 114 are provided at the boundary of the through hole 11 and the communication hole 113, the engagement of the boss 105 in the communication hole is kept by the holding projections. For that reason, once the boss 105 is engaged in the communication hole 113, the boss does not turn in reverse toward the through hole 111 as long as a turning force strong enough to cause the boss to move beyond both the holding projections 114 is not applied to the boss.

After the blower switch 102 is thus attached to the fitting portion 101 of the heater control panel 104, the manipulation knob 109 is fitted onto the shaft 108 from the front of the fitting portion. As a result, the fitting portion 101 restricts the movement of the knob 109 except in the direction of turning thereof. For that reason, the blower switch body 103 coupled to the knob 109 by the shaft 108 is immovable relative to the fitting portion 101.

Thus, the blower switch 102 is firmly fixed to the fitting portion 101 through very simple work without using a nut as in conventional prior art. Therefore, the nut and the tightening thereof are not needed, so that the number of elements and that of assembly steps are reduced.

Figure 15:
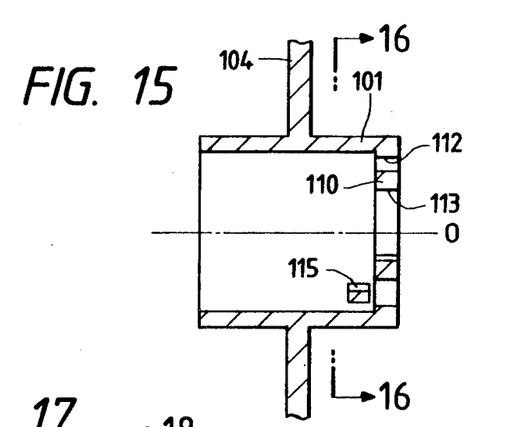
FIG. 15 is a sectional view of the fitting portion.
Figure 16:
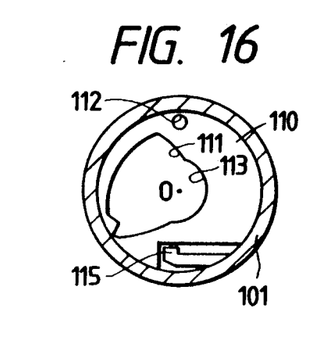
FIG. 16 is a sectional view along a line 16—16 shown in FIG. 15.
Figure 17:
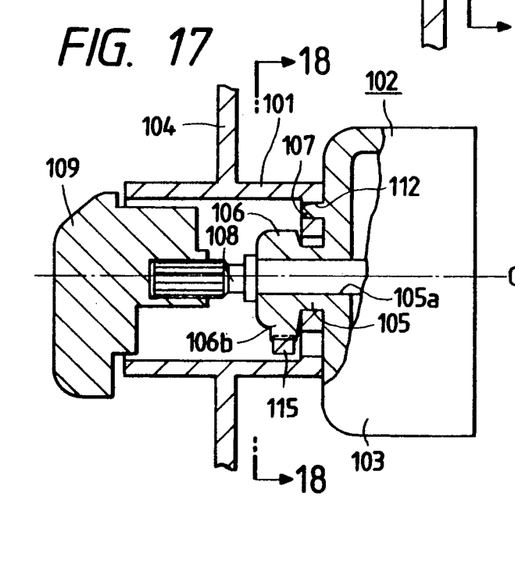
FIG. 17 is a partially sectional view showing the state that the switch is secured to the fitting portion.

FIGS. 14-19 show a device for securing a blower switch 102 to a heater control panel 104 according to a third embodiment of the present invention. As shown in the drawings, a protuberance 106b is provided on the peripheral surface of the flange 106 of the switch 102, and projects outward therefrom in the radial direction thereof. The form of the through hole 111 of the fitting portion 101 of the panel 104 corresponds to that of the flange 106. As shown in FIGS. 15 and 16, an engagement claw 115 is integrally formed on the inside of the fitting portion 101 near the bottom of the rear end part thereof, and extends along a part of the circumference of the portion. The claw 115 can be flexed in the radial direction of the fitting portion 101. Except for these features, the third embodiment is similar to the second embodiment shown in FIGS. 9-13.

Figure 18:
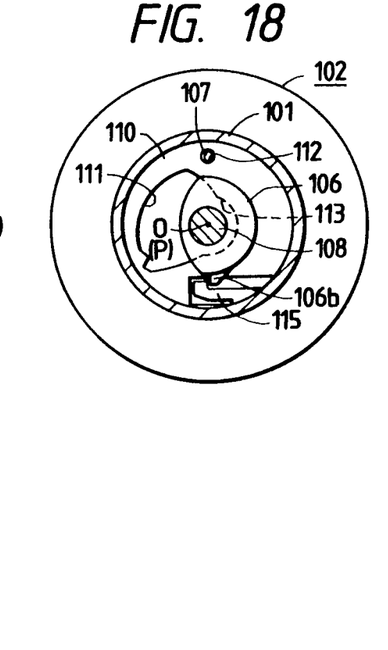
FIG. 18 is a sectional view along line 18—18 shown in FIG. 17.
Figure 19:
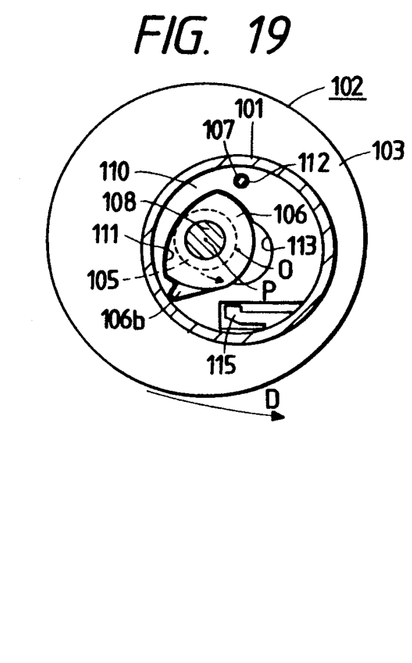
FIG. 19 is a sectional view showing the state that the flange of the switch is inserted through the through hole of the fitting portion.

When the blower switch 102 is to be attached to the fitting portion 101 by the device shown in FIGS. 14-19, the flange 106 is inserted through the through hole 111 and a protuberance 107 is engaged in a hole 112, as shown in FIG. 19. The body 103 of the switch 102 is then turned about the protuberance 107 in a direction D shown in FIG. 19. At that time, the flange 106 is moved and the protuberance 106b thereof comes into contact with the tip of the engagement claw 115 so that the turning of the body 103 is stopped by the claw. Subsequently, a turning force is applied to the body 103 to flex the claw 115 outward in the radial direction of the fitting portion 101 to allow the flange 106 to be turned further so that the projection 106b of the flange 106 is engaged with the claw, as shown in FIG. 18. Thus, the device not only produces the same operation and effect as does the device shown in FIGS. 9-13, but also the flange 106 is made unturnable by the engagement of the protuberance 106b of the flange with the top of the engagement claw 115. For that reason, the device does not need to have holding projections such as those 114 of the preceding device.

The present invention is not confined to the above-described embodiments, but may be otherwise and optionally embodied or practiced without departing from the spirit or essential character thereof, as described below.

(1) Although the front of the flange 106 is not circularly shaped in the second embodiment, the front may be circularly shaped in the embodiment.

(2) The positional relationship between the protuberance 107 and the hole 112 may be reversed to provide the hole in the front of the body of the blower switch 101 and provide the protuberance on the rear of the fitting portion 101. Despite this reversal, the same operation and effect will be produced as the above-described embodiment.

(3) The present invention may be applied not only to rotary-type blower switches but also to other various types of manipulated components such as toggle switches, push switches, a rotary variable resistor and a rotary variable capacitor.

A device in accordance with the present invention allows a manipulated component to be secured. The component can be surely and firmly fixed to a panel through simple work without using a nut, to thereby reduce the number of elements and the number of assembly steps.

What is claimed is:

1. A device for securing a manipulated component to a fitting portion of a panel so that a shaft of said component extends through said panel, wherein said component includes:
   a boss;
   a flange; and
   an engagement portion;
   wherein said boss projects to said fitting portion and covers said shaft at a rear end thereof, said flange is formed at the front end of said shaft, and said engagement portion projects to said fitting portion, and located in a position different form that of said boss; and
   wherein said fitting portion has:
   a through hole; and
   a means for securing said component to said fitting portion;
   wherein said flange is inserted through said through hole so that an attaching position of an axis of said engagement portion is different from a manipulating position of an axis of said shaft as said component is attached to said panel, wherein said attaching position and said manipulating position are separated in a radial direction; and
   wherein said securing means secures said component to said fitting portion when said component is moved to said attaching position from said manipulating position by turing said component while maintaining said flange within said through hole.

2. A device for securing a manipulated component to a fitting portion of a panel so that a shaft of said component extends through said panel, wherein said component comprises:
   a boss;
   a flange; and
   an engagement protuberance;
   wherein said boss projects to said fitting portion, and covers said shaft at a rear end thereof, and said protuberance projects to said fitting portion from a part different from that from which said boss projects;
   wherein said fitting portion has:
   a through hole; and
   an engagement notch;
   wherein said flange is inserted through said through hole so that an attaching position of an axis of said shaft is different from a manipulating position of said axis, said attaching position and said manipulating position being radially spaced; and
   wherein said notch is engaged with said protuberance to prevent the turning of said component, when said component is positioned so that said axis is moved into said manipulating position after said component is turned about said shaft as said flange remains inserted through said hole.

3. A device according to claim 2, wherein the component includes a second engagement protuberance projecting to the fitting portion, said second proturbance projecting from a part of said component different from that from which the boss projects; and
   wherein said fitting portion includes a second engagement notch so that when said component is slid in a direction, said notch becomes engaged with said second protuberance so as to prevent said component from moving any farther in said direction.

4. A device for securing a manipulated component to a fitting portion of a panel so that a shaft of said component extends through said panel, wherein said component has:
   a boss;
   a flange; and
   one of a protuberance and a hole;
   wherein said boss projects to said fitting portion, and covers said shaft at a rear end thereof;
   wherein said flange is formed on said boss at the front end thereof;
   wherein said one of the protuberance and hole is formed with a part different from that on which said boss is formed;
   wherein said fitting portion has:
   a through hole;
   one of a second hole and a second protuberance; and
   a communication hole;
   wherein said flange is inserted through said through hole into an insertion position;
   wherein said one of the second hole and second protuberance is engaged with said one of protuberance and hole when said flange is inserted through said through hole, said communication hole communicates with said through hole; and
   wherein said boss is engaged in said communication hole when said component is turned about said one of the protuberance and hole to put said shaft in a predetermined position, which is radially spaced from said insertion position, as said one of the protuberance and hole remains engaged with said one of the second hole or second protuberance.

* * * * *